United States Patent Office 3,136,361
Patented June 9, 1964

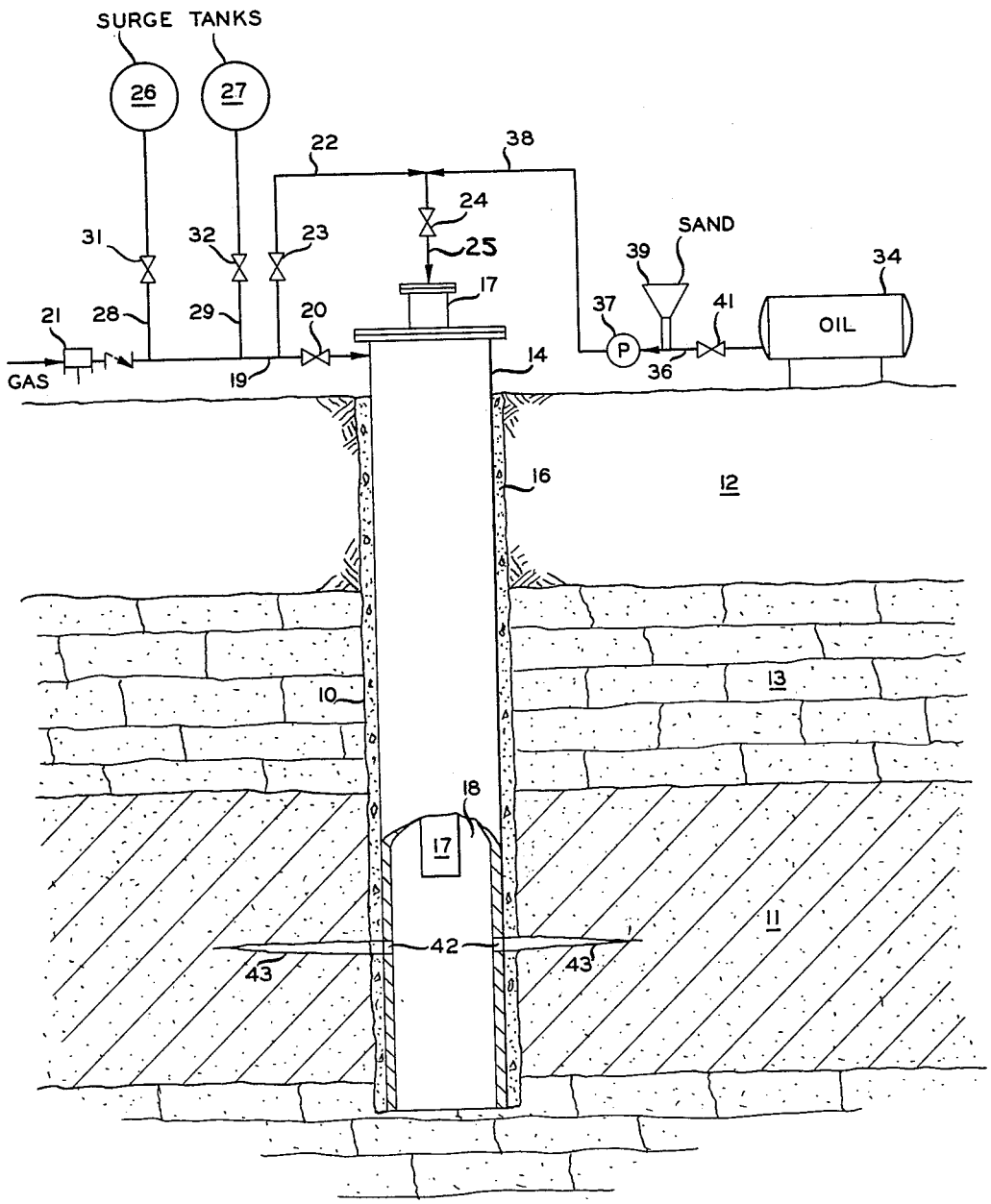

3,136,361
FRACTURING FORMATIONS IN WELLS
John W. Marx, Bartlesville, Okla., assignor to Phillips Petroleum Company, a corporation of Delaware
Filed May 11, 1959, Ser. No. 812,184
14 Claims. (Cl. 166—42)

This invention relates to fracturing formations in wells. In one aspect, it relates to the treatment of a subsurface earth formation penetrated by an oil and gas well, or other deep wells. In another aspect, it relates to a method and apparatus for increasing the productivity of fluids, such as oil or gas, from wells penetrating subsurface earth formations or strata of relatively low permeability.

In recent years, various methods have been proposed in the oil industry for increasing the productivity of oil or gas wells by enlarging the flow or drainage pattern within a selected oil- or gas-producing formation of relatively low permeability. Emphasis has been placed on hydraulically fracturing such formations with various liquids, such as native crude oil, diesel fuel, kerosene, etc., with or without propping agents, such as sand, suspended therein. The hydraulic pressure applied to such low permeable formations creates tensile stresses in the rock of the formation surrounding the well bore and these stresses cause splitting, parting, or fracturing of the rock, the pressure required to part or fracture a formation in a well being termed "formation breakdown pressure." The initially formed fractures or channels are then extended by the injection of hydraulic liquids therein, the propping agent being deposited in the fractures to maintain the permeability of the formation during subsequent production of the treated formation.

While a great number of wells have been successfully fractured with hydraulic fracturing liquids, the applicability of such fracturing methods is often limited by the nature of the fracturing liquid. These liquids, such as crude oil, are often highly viscous, thus requiring large pumping equipment to overcome the frictional resistance of the well tubing and achieve satisfactory high injection rates. When the formation breakdown pressure is reached, generally a large pressure drop results and the pumps must be capable of rapidly supplying a large volume of additional fracturing liquid in order to inject the liquid into the initially formed fractures and extend the same, such fracturing liquids being relatively incompressible. The use of such liquids for purposes of fracturing also generally require chemical treatment to improve the viscosity, gel strength, and fluid loss properties of the hydraulic liquids.

Accordingly, an object of this invention is to increase the productivity of a formation penetrated by an oil or gas well, or other deep well. Another object is to provide an improved method of fracturing relatively low permeable formations so as to increase the flow and drainage pattern and thereby stimulate production of said formation. Another object is to provide improved method and apparatus for increasing the productivity of fluids from subsurface earth formations or strata of relatively low permeability by fracturing the same. Another object is to provide an improved fracturing hydraulic fluid. Further objects and advantages of this invention will become apparent to those skilled in the art from the following discussion, appended claims and the accompanying drawing in which the single figure schematically illustrates a well penetrating a formation and apparatus to be used in fracturing the same according to this invention.

In one of its broader aspects, the subject invention comprises initiating fractures in a relatively low permeable formation traversed by a well bore by means of gas pressure and thereafter extending such fractures by injecting therein under high pressure an aerated hydraulic liquid having solid propping agents suspended or entrained therein, and preferably containing a surfactant, such as sodium lauryl sulfate.

Referring now to the single figure of the drawing, a well bore 10 is illustrated penetrating a producing formation 11, the latter being overlain by various earth strata 12, 13 of a non-productive nature. The producing formation 11 can be any of those known to be fracturable, such as consolidated sandstones, limestones, dolomites, granite washes, hard or brittle shale, and the like, such formations generally having a permeability in the range of 0.1 to 200 millidarcies. The well is provided with the usual high pressure well head connections and fittings, such as blow-out preventors, pressure gages, etc. Depending within the well bore 10 is a casing 14, which is set or held in place by a cement sheath 16. The lower end of the casing 14 may extend into the producing formation 11, as shown in the drawing, to provide a cased-hole, or the casing may terminate above the producing formation so as to provide an open-hole. Where the fracturing method of this invention is carried out by pumping the hydraulic fluids directly down the casing, for example, where high rates of injection are necessary, the casing is preferably made of a high-strength grade metal sufficient to withstand the high fracturing pressures. The well can also be provided with an inner string of tubing 17 depending within the casing 14, an annulus 18 being formed therebetween. The use of a tubing will generally be desired where the casing will not stand the fracturing pressures or where the producing formation or zone must be isolated by the use of one or more tubing packers. A single packer may be provided to seal off the annulus 18 just above the lower end of the tubing 17, or straddle packers can be used to isolate a portion of the producing formation desired to be fractured; the method of positioning packers in the desired location of the well bore should be obvious to anyone skilled in the art and further discussion is considered unnecessary.

The upper end of casing 14 can be connected to a high pressure gas line 19, having a flow control valve 20, which line communicates with annulus 18, this gas line being connected to suitable gas compressor means 21. Alternatively, the high pressure gas line 19 can be connected via gas lines 22, 25 to the upper end of tubing 17, lines 22 and 25 being provided with flow control valves 23 and 24, respectively. In order to provide an available ready supply of compressed gas at high pressure, gas line 19 can be connected to a plurality of gas surge tanks 26, 27 by means of gas lines 28, 29 having flow control valve 31, 32 respectively. A source 34 for oil, water, or other hydraulic liquid, such as a tank or pump truck, is provided near the well head, and this source communicates via pressure line 36 with a pump 37 which is capable of pumping a hydraulic liquid under sufficiently high pressure via lines 38, 22, 25 to the well. Propping material, such as sand or gravel, and surfactant or foaming agent can be introduced into the hydraulic liquid at the suction line pump 37 from one or more hoppers 39, or the propping material, as well as the surfactant and any other necessary chemicals, can be mixed and agitated with the fracturing liquid by the use of suitable chemical pumps, or the like. The aerated hydraulic fracturing fluid or foam is best prepared by either agitating a slurry of the hydraulic liquid, propping agent, and surfactant, or mixing dry propping material and powdered surfactant and directing a high velocity jet of the hydraulic liquid into the loose mixed solids.

In operation where a cased-hole is provided, the lower end of casing 14 adjacent the selected portion of formation 11 desired to be fractured can be perforated by conventional means, such as with a perforating gun lowered in the well by means of a wire line, to provide one or more perforations 42 in the casing and cement sheath. The perforations and the pores in the formation can be cleaned of mud, or other plugging material, by circulating in the well any suitable cleaning liquid, such as acid and surfactants. Where the fracturing operation is carried out in open-hole, perforating operations are not necessary. Preparations are then made to begin the fracturing treatment.

In order to provide a ready supply of high pressure compressed gas, the gas compressor 21 is started up and gas pressure surge tanks 26, 27 filled with compressed gas. Thereafter, the well itself is pressurized with the compressed gas, either by injecting the gas from the compressor via gas line 19 or via gas lines 22, 25. When a sufficient supply of compressed gas is built up and the various pressure lines tested for leaks, the formation breakdown pressure is built up, that is, the gas pressure in the confined zone of the well is increased until fracturing pressure is reached. This formation breakdown pressure will generally be less than or equal to the overburden pressure and for most formations will be from about 0.6 to 1.0 p.s.i. per foot of depth of the selected portion of the formation, e.g., from 500 to 3500 p.s.i. When the formation breakdown pressure is reached, the formation of fractures 43 will be initiated, as indicated by a pressure drop at the surface. Without releasing the high gas pressure, that is, while maintaining the gas pressure, a hydraulic liquid, such as oil, is then pumped into the well, this liquid admixing with the high pressure compressed gas to form an aerated hydraulic liquid. For example, the hydraulic liquid is pumped into the upper end of tubing 17 and it is admixed in the well with the compressed gas pumped into the annulus 18, an aerated liquid such as a form or froth be generated in the well. This aerated liquid is then injected into the initially formed fractures or channels 43, extending the same further into the formation 11. Alternatively, the hydraulic liquid is pumped via line 38 and admixed with gas supplied from gas line 19 via line 22, the aerated mixture being injected via tubing 17 into the initially formed fractures.

The aerated liquid, a mixture of gas and liquid, can contain propping material such as finely divided sand or gravel, entrained or suspended therein. The aerated mixture enters the fractures at a fast rate, the extension or length of the fractures depending on the volume of the injected aerated liquid, the volume of this mixture retained in the fracture, and the geometry of the fracture. Although the fractures illustrated in the drawing are oriented in a horizontal plane, such fractures can be vertical or slightly inclined from the vertical, depending upon formation stresses and tensile strength of the rock. Following the injection of the aerated hydraulic fluid into the fractures 43, and extension thereof, the hydraulic liquid itself can be pumped into the well and used to further extend the fractures, if desired.

At the end of the fracture treatment, pressure is released and the fractures are filled with the aerated mixture or hydraulic liquid and sand or other propping material. The liquid continually leaks off into the formation until the walls of the fractures close down on the deposited propping material which holds the fractures open, thereby maintaining the permeability of the formation. As a result of the fracture treatment, the flow or drainage pattern of the formation is enlarged and the productivity of the well is increased. The formation can be successively fractured by additional fracture treatments in the same or different selected portions of the formation.

In carrying out the subject invention, any noncondensible, compressible gas can be used, such as air, natural gas, carbon dioxide, nitrogen, and the like. The particular gas to be used will depend upon its availability, the particular hydraulic liquid employed to form the aerated mixture, the required fracturing pressures, and other factors. The use of a compressible gas to initiate fractures has the advantage of being able to build up a readily available supply of pressure, the compressed gas being stored in the gas surge tanks, in the lines of the compressed gas system, and in the well. Due to the compressible nature of the gas, when the formation breakdown pressure is reached, this compressed gas will expand and rush into the fractures at a much faster rate than would an incompressible liquid, such as oil. The use of such hydraulic liquid by itself for initiating and propagating fractures requires higher injection rates following the pressure drop in order to supply a large volume of additional liquid. The use of compressed gas has the advantage of being able to store the compression energy of the gas prior to the actual fracturing operation, thus requiring a relatively small capacity compressor and enabling the release of the stored gas upon demand during the fracturing operation, for example, prior to or after formation breakdown pressure is reached.

The hydraulic liquid used in this invention for the purpose of forming the aerated hydraulic fracturing liquid used to extend the initially formed fractures can be of any of those commonly used or known in the art, such as native crude oils, gas oil, kerosene, gasoline, diesel fuel, heavy fuel oil of the Bunker C type, naphtha, various low viscosity hydrocarbon liquids, water, and the like. Such liquids can be treated in a conventional manner with chemicals to impart viscosity and gel strength, to improve the fluid loss thereof, and the like. Further, suitable conventional foaming agents can be added to the liquid so as to improve the foaming characteristics of the liquid when admixed with the gas.

The propping agent used in this invention can be any of those known in the art, and generally will be finely divided sand or gravel. An especially useful propping agent is Ottawa sand. Where sand is used, this material can be from about 10 to 80 mesh, preferably 20 to 60 mesh U.S. sieve. The amount of sand used will depend on various considerations, such as the size of the fracturing treatments, the depth of the formation, the particular hydraulic liquid, etc., and generally will vary between 0.5 to 6 lbs./gal. of hydraulic liquid. This aerated hydraulic fluid has very good sand carrying ability and will be stable over a long period.

The surfactants used in aiding the aeration of the hydraulic liquid will generally be employed in amounts sufficient to provide the desired degree of aeration; generally the amount will be in the range of 0.1 to 0.5 percent by weight of the hydraulic liquid. Representative types of surfactants which can be employed in this invention include alkyl aryl sulfonates, alkyl phenoxypolyoxyethylene, metallic salts of fatty acids, and the like. These surfactants or detergents can be cationic, anionic, or nonionic, preferably the latter since they will be generally more stable under bore hole conditions. Ordinary soaps, such as sodium stearate, etc., will give the added benefit, where fresh water is used as the hydraulic liquid, of precipitating on contact with connate reservoir brine and thus act as a fluid loss preventative.

Specific surfactants which can be used representatively include sodium lauryl sulfate, sodium stearate, sodium linolenate, substituted oxazoline, condensates of ethylene oxide and polyoxypropylene-glycol polymers, coconut oil fatty acid amine condensates, polyethylene glycol esters of rosin, polyethylene glycol ethers of hydroabietyl alcohol, polyethylene glycol ethers of alkylated phenol, isooctyl phenoxypolyoxyethylene, isooctyl phenyl polyethoxy ethanol, and the like, such as those in the 4th revision of surfactants set forth by John W. McCutcheon in the December 1957 issue and the January, February, March and April 1958 issues of Soap and Chemical Specialties.

Various modifications and alterations will become apparent to those skilled in the art from the foregoing discussion and accompanying drawing, and it is to be under-

I claim:

1. A method of treating a formation penetrated by a well, which comprises introducing compressed gas only into said well, increasing the pressure of said compressed gas in said well until said formation is fractured, maintaining pressure on said compressed gas in said well, and subsequently introducing into said fractures an aerated liquid under pressure so as to extend said fractures.

2. A method of fracturing a subsurface earth formation of low permeability penetrated by a well bore so as to increase the productivity thereof, which method comprises introducing a compressed gas into said well bore, increasing the pressure of said compressed gas in said well bore until said formation is initially fractured, maintaining pressure on said compressed gas in said well, introducing into said well bore an aerated hydraulic liquid having solid propping material suspended therein, and injecting said aerated hydraulic liquid under high pressure into the initially formed fractures in said formation so as to extend the same.

3. The method according to claim 2 wherein said gas is air.

4. The method according to claim 2 wherein said gas is carbon dioxide.

5. The method according to claim 2 wherein said liquid is oil.

6. The method according to claim 2 wherein said liquid is water.

7. The method according to claim 2 wherein said gas is air, said liquid is water, and said propping material is sand.

8. The method according to claim 2 wherein said gas is natural gas, said liquid is oil, and said propping material is sand.

9. The method according to claim 2 wherein said formation is an oil-bearing formation.

10. A method of increasing the productivity of a well penetrating an oil-bearing formation of relatively low permeability, which method comprises introducing a compressed gas into said well, increasing the pressure of said compressed gas in said well until formation breakdown pressure is reached so as to initially fracture said formation, maintaining pressure on said compressed gas in said well, pumping into said well under pressure an aerated hydraulic liquid containing a surfactant and solid propping material suspended therein, injecting said aerated hydraulic liquid under pressure into said initially formed fractures in said formation so as to extend the same, releasing the pressure on said aerated hydraulic liquid, and producing said formation.

11. A method for increasing the productivity of a well penetrating an oil-bearing formation of relatively low permeability, which method comprises building up a surge supply of compressed gas under high pressure at the surface of the well, introducing said compressed gas in said well, increasing the pressure of said compressed gas in said well until formation breakdown pressure is reached so as to initially fracture said formation, introducing said surge supply of compressed gas into said well, maintaining pressure on said compressed gas in said well, pumping into said well under pressure an aerated hydraulic liquid containing a surfactant and solid propping material suspended therein, injecting said aerated hydraulic liquid under pressure into said initially formed fractures in said formation so as to extend the same, releasing the pressure on said aerated hydraulic liquid, and producing said formation.

12. The method according to claim 11 wherein said well comprises a well bore having a casing, and said compressed gas and hydraulic liquid are introduced into said casing.

13. The method according to claim 11 wherein said well comprises a well bore having a casing and a tubing depending therein, and said compressed gas and aerated hydraulic liquid are introduced into said well through said tubing.

14. The method according to claim 11 wherein said well comprises a well bore having a casing and a tubing depending therein, with an annulus formed between said casing and tubing, and said compressed gas is introduced into said well through said annulus and said hydraulic liquid is introduced into said well through said tubing.

References Cited in the file of this patent

UNITED STATES PATENTS

| | | |
|---|---|---|
| 2,643,208 | Ogden et al. | June 23, 1953 |
| 2,693,854 | Abendroth | Nov. 9, 1954 |
| 2,713,908 | Curtis | July 26, 1955 |
| 2,742,426 | Brainerd | Apr. 17, 1956 |
| 2,758,653 | Desbrow | Aug. 14, 1956 |
| 2,766,828 | Rachford | Oct. 16, 1956 |
| 2,779,418 | Garst | Jan. 29, 1957 |
| 2,780,449 | Fisher et al. | Feb. 5, 1957 |
| 2,796,129 | Brandon | June 18, 1957 |
| 2,838,117 | Clark et al. | June 10, 1958 |
| 2,841,222 | Smith | July 1, 1958 |
| 2,866,507 | Bond et al. | Dec. 30, 1958 |
| 2,869,643 | Schuessler et al. | Jan. 20, 1959 |
| 2,875,833 | Martin | Mar. 3, 1959 |
| 2,876,839 | Fast | Mar. 10, 1959 |
| 3,004,594 | Crawford | Oct. 17, 1961 |
| 3,063,499 | Allen | Nov. 13, 1962 |